United States Patent
Hron, II

(10) Patent No.: US 12,380,271 B2
(45) Date of Patent: Aug. 5, 2025

(54) FEDERATED SYSTEM AND METHOD FOR ANALYZING LANGUAGE COHERENCY, CONFORMANCE, AND ANOMALY DETECTION

(71) Applicant: Thomson Reuters Enterprise Centre GmbH, Zug (CH)

(72) Inventor: Joel M. Hron, II, The Woodlands, TX (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 286 days.

(21) Appl. No.: 17/990,025

(22) Filed: Nov. 18, 2022

(65) Prior Publication Data

US 2023/0161958 A1 May 25, 2023

Related U.S. Application Data

(60) Provisional application No. 63/283,049, filed on Nov. 24, 2021.

(51) Int. Cl.
*G06F 40/237* (2020.01)
*G06F 16/35* (2025.01)

(52) U.S. Cl.
CPC ............ *G06F 40/237* (2020.01); *G06F 16/35* (2019.01)

(58) Field of Classification Search
CPC ...... G06F 40/237; G06F 16/35; G06F 40/284; G06F 40/30; G06F 16/243; G06F 16/285; G06F 16/93; G06N 20/00
See application file for complete search history.

(56) References Cited

U.S. PATENT DOCUMENTS

| | | | |
|---|---|---|---|
| 7,529,719 B2 * | 5/2009 | Liu | G06F 16/35 706/29 |
| 9,183,203 B1 | 11/2015 | Tuchman et al. | |
| 11,226,720 B1 | 1/2022 | Vandivere et al. | |
| 2005/0010819 A1 | 1/2005 | Williams et al. | |

(Continued)

OTHER PUBLICATIONS

PCT App. No. PCT/US2022/050368, International Search Report and Written Opinion, Mar. 6, 2023, 9 pages.

(Continued)

*Primary Examiner* — Bhavesh M Mehta
*Assistant Examiner* — Jangwoen Lee
(74) *Attorney, Agent, or Firm* — Derek D. Donahoe; Polsinelli PC

(57) ABSTRACT

Aspects of the present disclosure involve systems and methods for evaluating a piece of text or document against many corpuses of text or documents located on sources which may be the same and/or different from the text of interest in a tensorized manner and aggregating the coherence/anomaly score against some or all of the entire corpus. This joining of multiple data sources for evaluating the given piece or text may be a "federated" system as disparate data sources, each of which may contain confidential or otherwise private information, may be considered as a single repository of texts or documents. The systems and methods provide for a coherency and/or anomaly check of a piece of text of a document against similar pieces of text to determine a similarity of the piece of text to a large corpus of documents stored in disparate locations.

18 Claims, 7 Drawing Sheets

(56) References Cited

U.S. PATENT DOCUMENTS

2018/0349477 A1* 12/2018 Jaech .................. G06F 16/9535
2020/0394197 A1* 12/2020 Gutfreund ............. G06F 16/951
2021/0216928 A1* 7/2021 O'Toole ................. G06F 16/29
2022/0300505 A1* 9/2022 Wang .................. G06F 16/1805

OTHER PUBLICATIONS

Miltsakaki et al., "Evaluation of text coherence for electronic essay scoring systems," Natural Languange Engineering 10(1): 25-55, 2004.
Bader et al., "MATLAB Tensor Classes for Fast Algorithm Prototyping." ACM Transactions on Mathematical Softward(TOMS) 32.4 (2006): 635-653.
Ansah et al., "Leveraging burst in twitter network communities for event detection," Mar. 4, 2020, Retrieved Jan. 24, 2023, https://link.springer.com/article/10.1007/s11280-020-0786-y , 27 pages.

* cited by examiner

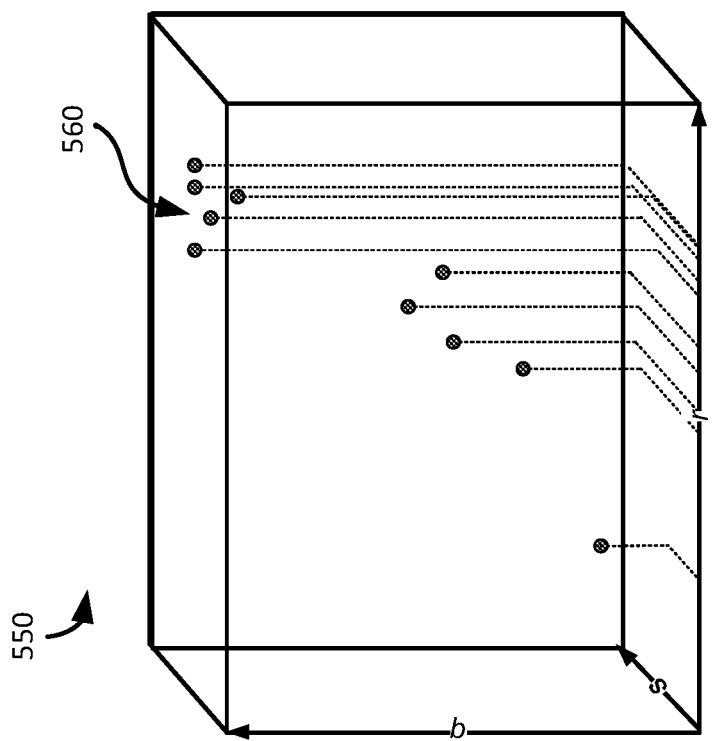
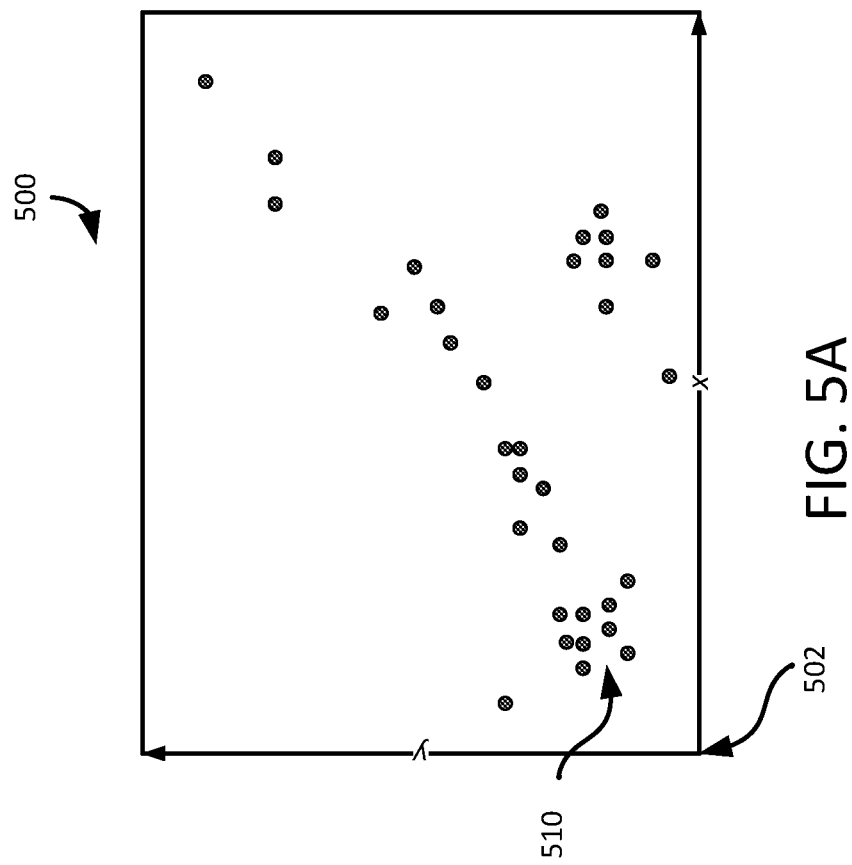
FIG. 5B
FIG. 5A

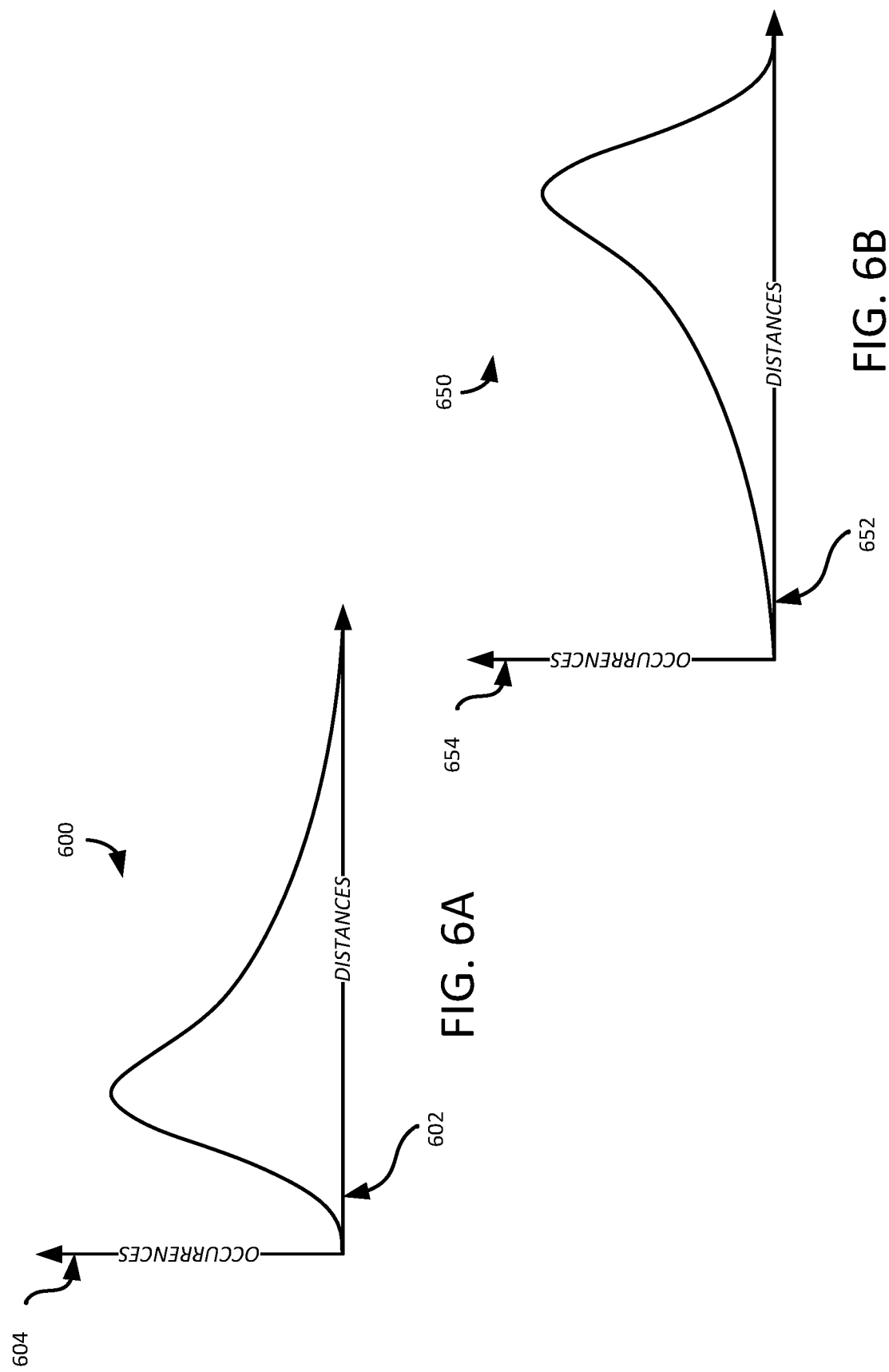

FEDERATED SYSTEM AND METHOD FOR ANALYZING LANGUAGE COHERENCY, CONFORMANCE, AND ANOMALY DETECTION

CROSS-REFERENCE TO RELATED APPLICATION

This application is related to and claims priority under 35 U.S.C. § 119(e) from U.S. Patent Application No. 63/283,049 filed Nov. 24, 2021, entitled "Federated System and Method for Analyzing Language Coherency, Conformance, and Anomaly Detection", the entire contents of which is incorporated herein by reference for all purposes.

TECHNICAL FIELD

The present disclosure relates to processing of documents, and particularly to evaluating a given piece of text or document from one source and comparing it against many corpuses of text or documents located at other sources in a tensorized manner and aggregating a coherence/anomaly score against text or documents across sources.

BACKGROUND

In nearly any relatively large organization, whether it be a corporate organization, governmental organization, educational organization, etc., document management is important but very challenging for a myriad of reasons. In many situations, organizations have adapted document management systems and related databases that may provide users with tools to organize and/or modify documents. For example, some document management systems provide a mechanism through which documents may be objectively compared to earlier versions of the same document—e.g., by showing how one version is textually different from another version. However, such systems often do not provide a convenient mechanism for objective comparison of different documents. Moreover, conventional systems do not provide a way for subjective comparison. Understanding how the text objectively and subjectively of some documents compares to similar text within other documents may yield numerous insights.

Consider for example various forms of contracts. It is typical for contracts to include a termination clause that defines when and under what circumstances a contract is terminated. Like many different requirements of various types of legal documents, termination clauses may vary widely in defining the circumstances under which a particular contract terminates, and other than obtaining an opinion from a lawyer, the organization may have no understanding of the strengths and/or weakness of any particular termination clause, how it may vary relative to other termination clauses in other agreements, whether it is industry standard or deviates in any meaningful ways from the industry standard, the potential risk to the organization, and the like. Analyzing portions of documents for accuracy, strength, conformity, and potential risk is often a costly endeavor and may require significant time, depending on the number of documents to be reviewed and analyzed.

It is with these observations in mind, among others, that aspects of the present disclosure were concerned and developed.

SUMMARY

Embodiments of the invention concern electronic document processing systems and methods. In a first implementation of the invention of a system comprising a processor and a memory comprising instructions. Execution of the instructions may cause the processor to transmit an initial tensor generated from a text portion of an electronic document to a plurality of computing environments, each of the plurality of computing environments hosting a language coherency system configured to calculate a comparison score based on a comparison of the initial tensor to a corpus of local electronic documents of a respective language coherency system, generate a distribution of comparison scores received from each of the language coherency systems, and display, on a display device, the distribution of comparison scores for the initial tensor for comparison of the text portion to a plurality of corresponding tensors from the corpus of local electronic documents The instructions may further cause the processor to identify, based on the distribution of comparison scores, a similarity of the text portion of the electronic document to the corpus of local electronic documents of the respective language coherency systems while maintaining inaccessibility of the corpus of local electronic documents by the processor.

In another implementation may include a method for processing a portion of an electronic document. The method may include the operations of executing, via a processing device, a conversion algorithm to convert a text portion of the electronic document into an initial tensor, transmitting the initial tensor to a plurality of computing environments different than the processing device, each of the plurality of computing environments hosting a language coherency system to calculate a similarity score through a comparison of the initial tensor to a corpus of local electronic documents of a respective language coherency system, and generating, via the processing device, a distribution of similarity scores generated by each of the language coherency systems based on the comparison of the initial tensor to a plurality of comparison tensors of local electronic documents.

In yet another implementation may include one or more non-transitory computer-readable storage media storing computer-executable instructions for performing a computer process on a computing system. The computer process may include the operations of executing, via a processing device, a conversion algorithm to convert a text portion of a received electronic document into an initial tensor, transmitting the initial tensor to a plurality of computing environments, each of the plurality of computing environments hosting a language coherency system to calculate a similarity score through a comparison of the initial tensor to a corpus of local electronic documents of a respective language coherency system, and generating, via the processing device, a distribution of similarity scores generated by each of the language coherency systems based on the comparison of the initial tensor to a plurality of comparison tensors of local electronic documents.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

FIG. 5A is an illustration of two-dimensional clustering of documents, in accordance with various embodiments.

FIG. 5B is an illustration of three-dimensional clustering of documents, in accordance with various embodiments.

FIG. 6A is a first distribution graph of calculated distances of a tensor of interest to a corpus of related tensors, in accordance with various embodiments.

FIG. 6B is a second distribution graph of calculated distances of a tensor of interest to a corpus of related tensors, in accordance with various embodiments.

DETAILED DESCRIPTION

Figure 1:
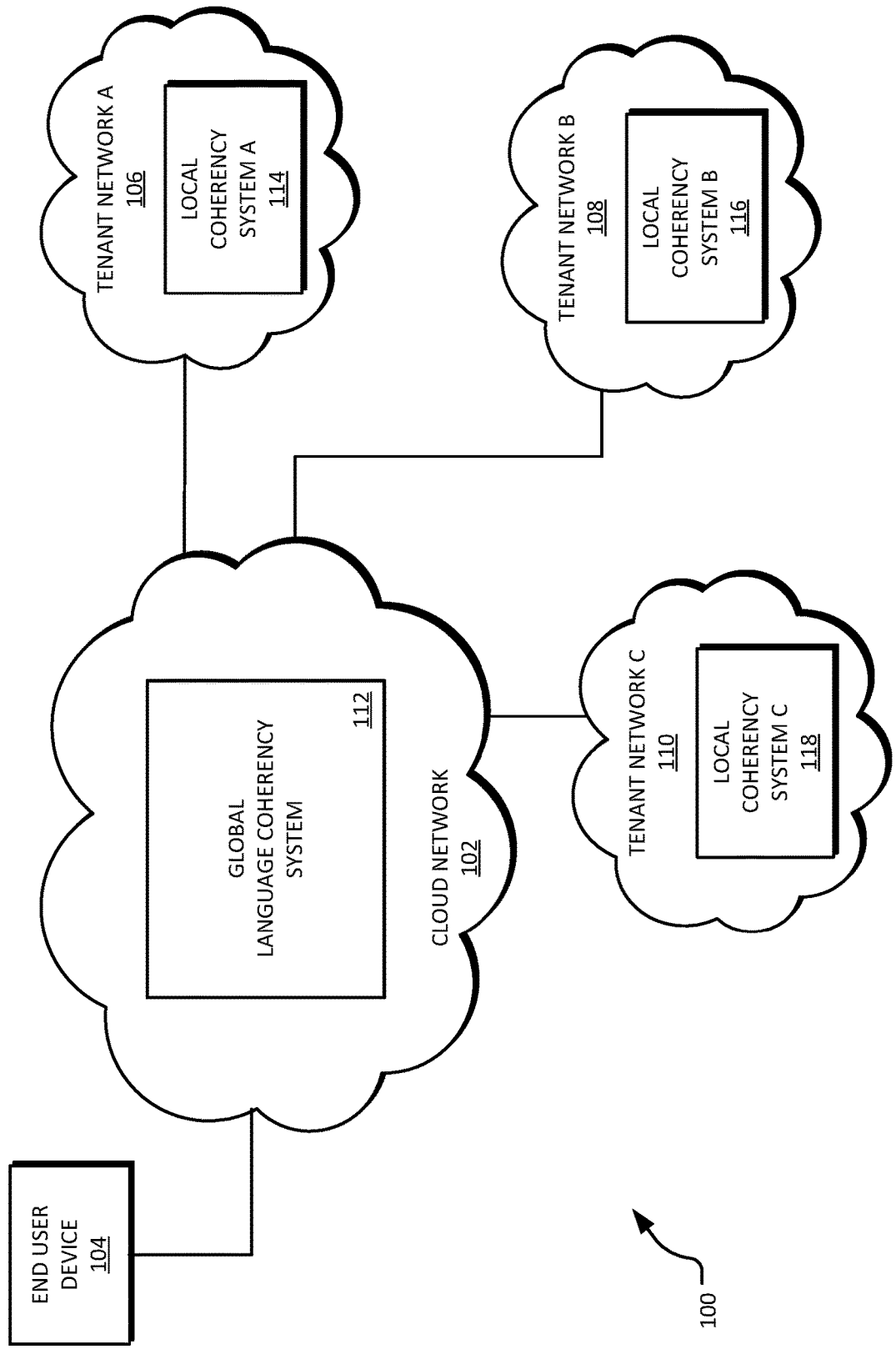
FIG. 1 is a system diagram for a plurality of language coherency systems instantiated in various computing environments, in accordance with various embodiments.

Aspects of the present disclosure involve systems and methods for evaluating or comparing a given piece of text or document against many corpuses of text or documents located on sources, such as servers, databases, cloud environments and networks, which may be the same and importantly may also be different from the text of interest in a tensorized manner and aggregating the coherence/anomaly score against some or all of the entire corpus. This joining of multiple data sources for evaluating the given piece or text or document may be referred to herein as a "federated" system or technique as disparate data sources, each of which may contain confidential or otherwise private information, may be considered as a single repository of texts or documents. The systems and methods provide for a coherency and/or anomaly check of a piece of text of a document, such as a provision of a legal document, against similar pieces of text to determine a similarity of the piece of text to a large corpus of documents stored in disparate locations. The piece of text for comparison and analysis may be a portion of a document, an entire document, or a collection of documents. The corpus of text or documents to which an identified piece of text is compared may be deployed in a multi-tenant configuration in which each instance of an application is deployed in a separate computing environment. Such environments may include a public cloud environment, a private cloud environment associated with a tenant entity, an on-premise computing environment, and the like. Through the systems and methods described herein, the documents and texts of the various computing environments may be leveraged to gain an understanding of a coherency and/or anomaly of a piece of text without access being granted to the documents within the corpus. As such, the system may benefit from a far larger corpus of text and documents than available for any given single source while not exposing the actual text or document.

In one instance, a computing device may be utilized to identify a piece of text, a character, a clause, or any other portion of including the entirety of an electronic document. A tensor of the identified text may be generated through any variety of algorithms, including but not limited to a pre-defined hashing algorithm, trained vocabulary-based methods, or a trained machine learning based embedding model. In general, the tensor of an identified span of text is a numerical representation of the span of text, which in some cases may be a multi-linear data structure, that provides for comparison to other tensors generated from other spans of text. Other representations of the span of text may also be generated through other representation techniques and used in the federated system described herein. The generated tensor of the identified text may be provided to a centralized or global coherency system or may be maintained by a local coherency system. The global coherency system and/or the local coherency system may be in communication with other coherency systems or applications implemented on one or more other computing environments. The tensor of interest may then be provided or transmitted to the other computing environments or networks for comparison to similar documents or texts maintained by the respective tenant networks. More particular, each tenant network may execute an instance of the coherency system for comparing received tensors of text to documents or text maintained locally by the respective tenant network such that a larger corpus of documents may be used for analysis of the identified text.

One or more of the coherency systems at the tenant networks may similarly compute tensors for all of the other text spans within the available corpus for the corresponding tenant network. After these analogous tensors of spans of text in the available corpus are determined, each coherency system may execute some distance or proximity-based scoring algorithm to compute the distance between the tensor of interest and each of the tensors of the corpus. In one example, the distance algorithm may include a cosine-similarity algorithm. This set of tensor distances determined by each tenant network may be provided to a centralized coherency system for further analysis. The centralized coherency system may summarize the received distances and/or scores to demonstrate the relative distribution of tensors in the corpus and the percentile rank of the tensor of interest within that distribution. For example, "similar" tensors may be of interest for understanding the commonalities between them and "dissimilar" tensors may also be of interest to discern the relative variability observed within the text corpus. In some instances, the tensors could even be clustered using one of many clustering approaches to show similar variants of language in an aggregated sense. In general, once the requisite tensors for all relevant texts across all participating tenants have been computed, the centralized service may aggregate (either synchronously or asynchronously) the received distances into a statistical distribution or further analyze the distances to inform as to the score of the text sample of interest relative to the population. In other instances, still other algorithms or models could be analyzed across the population and aggregated. One example may include a risk model that takes as an input a tensor and provides a relative risk score. In this case, the risk model may compute a risk score for each of the tensors across the various tenants and aggregate these into population statistics in the same way executed for distance calculations.

Through the systems and methods described herein, a proprietary piece of text or set of texts may be compared with all or some known variants across a population of similarly proprietary texts to understand comparatively how the text fares against peers, without necessarily accessing or seeing any of the underlying proprietary texts of the other participants in the population. An analysis may be performed on the tensor across multiple populations of data and the results of these comparisons may be aggregated to inform as to the sample of interest's "place" within the broader population.

FIG. 1 depicts one example of a system diagram for a plurality of language coherency systems instantiated in various computing environments for evaluating a given piece of text or document from one computing environment and comparing it against corpuses of text or documents located on computing environments in a tensorized manner. The system may also aggregate a coherence/anomaly score of the given piece of text or document against documents across many computing environments. The system 100 may include multiple cloud computing environments or other type of computing environments. For example, tenant network A 106 may be a public cloud computing environment, tenant network B 108 may be a private cloud computing environment (such as a cloud environment managed by tenant B), and tenant network C 110 may be an on-premise environment. In general, the tenant networks 106-110 may be any network of connected devices for executing systems or portions of systems instantiated thereon. In still other instances, the tenant networks 106-110 may be a single computing device connected to the cloud network 102 to perform one or more of the methods or steps described herein.

Each of the tenant networks 106-110 may include an instance of a coherency system for evaluating a given piece of text or document from an electronic document against corpuses of text or documents located on other computing environments in a tensorized manner. For example, tenant network A 106 may include a first instance of the coherency system 114 instantiated on the one or more computing devices of the tenant network. In one particular example, the coherency system A 114 may be a virtual machine for which all or portions of the system is instantiated and executed by one or more computing devices of the tenant network. Each of the tenant networks 106-110 may include a corresponding local instance of the coherency system for comparing a given piece of text or document from one network against corpuses of text or documents local to the tenant network, as described in more detail below.

Through the systems and methods described herein, the documents and texts of the various computing environments may be leveraged to gain an understanding of a coherency and/or anomaly of a piece of text without access being granted to the documents within the corpus. As such, the system may benefit from a far larger corpus of text and documents than available for any given single source while maintaining propriety and/or confidentiality of a given organization storing documents in a local and secure network. This federation of the documents from various sources while maintaining the confidentiality of the documents provides a greater corpus from which a text span may be compared and contrasted without granting access to the substance of the documents to unauthorized parties.

The system 100 may also include a global language coherency system 112 deployed on cloud network 102. The global language coherency system 112 may be accessible by an end user device 104, which may be a computing device such as a server, personal computer, laptop, mobile device, tablet, and the like. Each of the local coherency systems 114-118 may also be accessible or otherwise communicate with the global language coherency system 112, as discussed in more detail below. In another implementation, end user device 104 may be a part of or in communication with another tenant network separate from the cloud network and may execute a local coherency system. The global coherency system 112 may therefore communicate with any number of local coherency systems 114-118 to perform one or more of the methods discussed herein. In one particular implementation, a user may utilize the end user device to identify a piece of text or a document associated with the end user device or a first tenant environment. The identified piece of text or document may then be compared to corpuses of text or documents located in other tenant environments, such as text or documents of tenant network A 106, tenant network B 108, and/or tenant network C 110, in a tensorized manner to determine a coherency of the identified text or document to others and/or aggregate an anomaly or other type of score against other text or documents.

Figure 2:
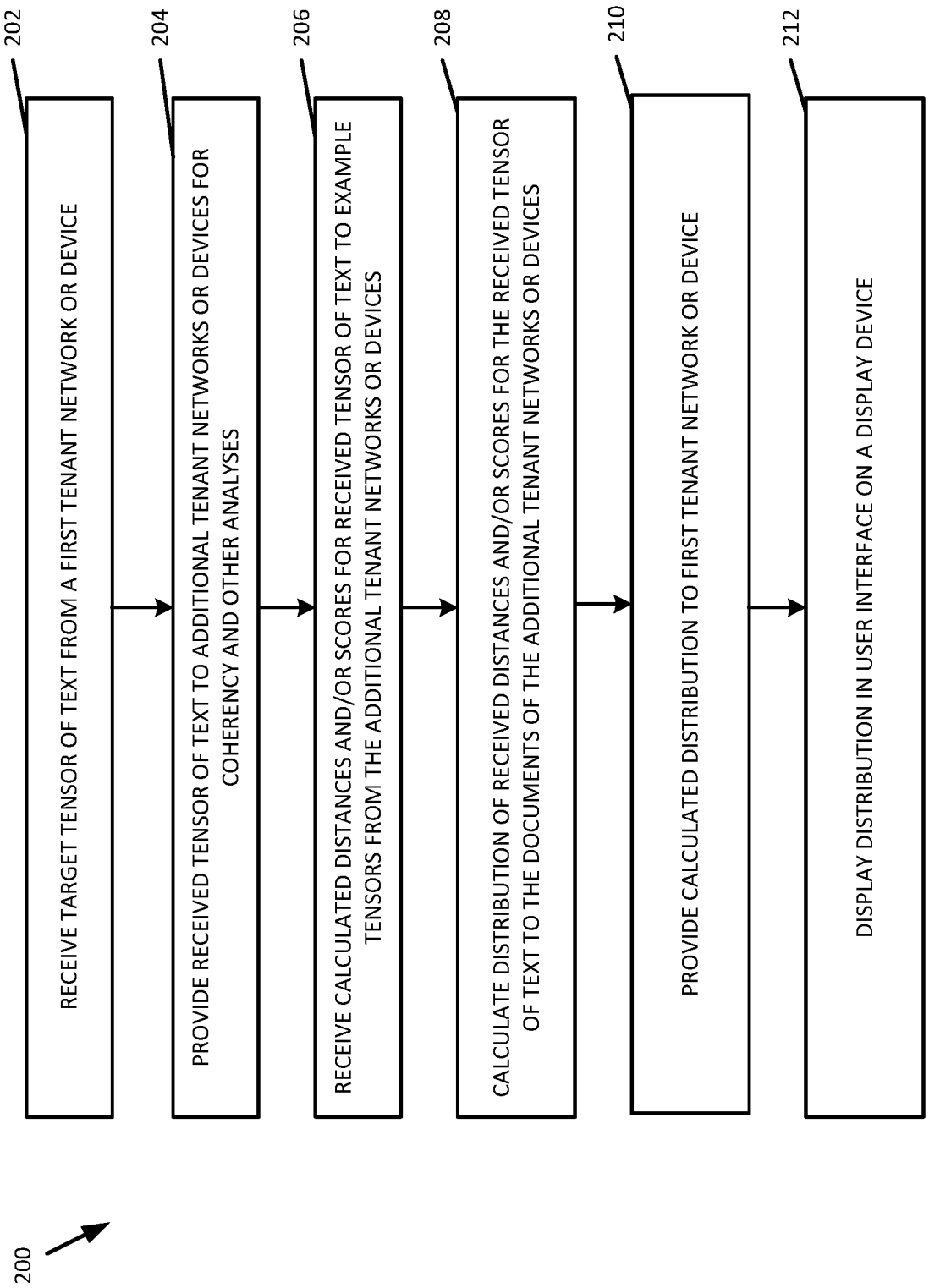
FIG. 2 is a flowchart of a method for analyzing language coherency across various document management platforms, in accordance with various embodiments.

FIG. 2 is a flowchart of a method 200 for analyzing language coherency across various document management platforms, in accordance with various embodiments. In one instance, the operations of the method 200 may be executed or performed by the global language coherency system 112 of the system 100 of FIG. 1. In other instances, one or more of the operations may be performed by a local coherency system 114-118 of tenant networks 106-110 or by a local coherency system associated with the end user device 104. Regardless, the operations may be performed through the execution of one or more software programs on the one or more hardware devices. The operations of the method 200 are described herein in relation to the global language coherency system 112 for example purposes only.

Beginning in operation 202, the global language coherency system 112 may receive a target tensor of some portion of text from a document or an entirety of a document as identified through the end user device 104. For example, a user interface executed on the end user device 104 may identify or receive an identification of a portion of an electronic document for analysis or an identification of the document itself for analysis. The text may be any portion of document, such as a term, a paragraph, a particular type of clause, and the like. In one instance, the user interface executed on the end user device 104 may display the electronic document and the text for analysis may be identified through the user interface. In some instances, the end user device 104 may be associated or in communication with a local coherency system that receives the indicated text or document for analysis.

The identified text or document may be transformed into a tensor for comparison to a corpus of similar text or documents from other sources. In one example, the text or document is transformed into the tensor using a pre-defined hashing algorithm that converts the text into a numerical value, such as a binary or base-ten value. Other methods for converting the text into the tensor may include a trained vocabulary-based method such as term frequency-inverse document frequency (tf-idf), or a trained machine learning based embedding model technique. In general, any known or hereafter developed technique for converting a selected text or document into a tensor, vector, embedding, or other representation for comparison may be utilized herein.

In one implementation, the identified text may be received at the global language coherency system 112 of the cloud network 102 and may calculate the tensor of the identified text. In another implementation, the end user device 104 may be in communication with a local language coherency system not instantiated within the cloud network 102 through which the tensor of the identified text may be calculated through one or more of the algorithms discussed above. The tensor may then be provided to the global language coherency system 112 of the cloud network 102 by the local coherency system in communication with the end user device.

In operation 204, the global language coherency system 112 may provide the tensor to additional tenant networks or devices where the tensor is used to identify similar text or document within the corpus accessible at the local tenant network, and more generally for comparison to a corpus of documents or texts of those tenant networks. For example, the global language coherency system 112 may provide a tensor of identified text received from end user device 104 to the local coherency system A 114 of tenant network A 106, the local coherency system B 116 of tenant network B 108, and the local coherency system C 118 of tenant network C 110. The global language coherency system 112 may also provide one or more instructions to the local language coherency systems 114-118 to execute a coherency and/or other analyses of the tensor to a corpus of similar texts or documents maintained by the local language coherency systems. For example and returning to the termination clause introduced above, the identified text may be a termination clause of a contract. Comparison of the tensor of the identified text of the termination clause may be executed against termination clauses of other documents maintained or otherwise available through the local coherency systems 114-116. For example, local coherency system A 114 of tenant network A 106 may identify termination clauses of documents stored at the local coherency system. Such termination clauses may be identified through an analysis of the text of the documents for language similar to other termination clauses. In another example, the local coherency system A 114 may analyze the text of the stored documents and classify portions of the text into categories and/or subcategories. One example of a system for classifying portions of a text into categories is described in U.S. patent application Ser. No. 15/887,689, entitled NATURAL LANGUAGE PROCESSING SYSTEM AND METHOD FOR DOCUMENTS, the entirety of which is incorporated by reference herein. In such a system, the local coherency system A 114 may generate a tensor for clauses or text that are identified as a termination clause. In this manner, the tensor of the termination clause of the identified text may be compared to termination clauses of several contracts or other types of documents of tenant network A 106. Similarly, the tensor of the termination clause may be compared to termination clauses of several contracts or other types of documents of tenant network B 108 and/or tenant network C 110. As explained in more detail below, the comparison of the tensor of the identified text may provide a user, device, or system a better understanding of a similarity of the text to other texts, among other understandings that may be obtained.

Each of the local coherency systems 114-118 and/or the global language coherency system 112 may be configured to identify portions of an electronic document similar to the text associated with a received tensor and to calculate a similarity of the received tensor to the text or documents at the local network. Further, each local coherency systems 114-118 may perform other analysis on the received tensor, such as determining an associated risk score for the text of the tensor or other determinations.

The federated system described herein provides a mechanism for analyzing and comparing documents from various networks or disparate computing environments while maintaining propriety and/or confidentiality of a given organization storing documents in a local and secure network. The large corpus of documents to which an identified text may be compared allows a user or computing device to gain an understanding of a coherency and/or anomaly of a piece of text without access being granted to the documents within the corpus. Understanding the similarity or dissimilarity of a span of text may provide insight into the coherence of the text and may quantify a risk factor of the span of text in relation to a legal document, such as a contract from which the span of text may be obtained.

Figure 3:
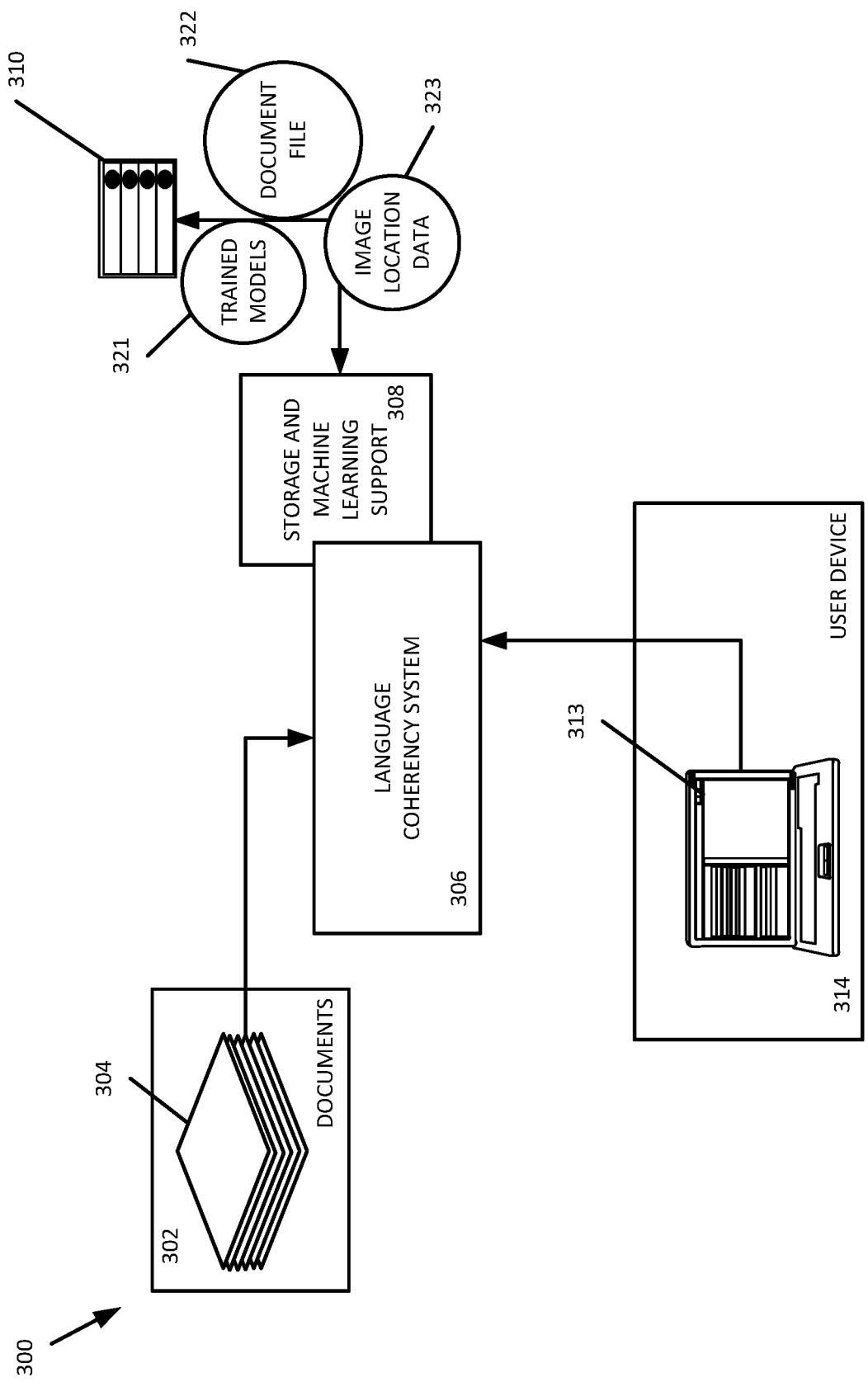
FIG. 3 is a system diagram for a document management system for analyzing language coherency across various document management platforms, in accordance with various embodiments.

FIG. 3 is a system diagram for a document management system 300 for analyzing language coherency across various document management platforms, in accordance with various embodiments. Each of the local coherency systems 114-118 and/or the global language coherency system 112 may include some or all of the components of the system 300 of FIG. 3. Further, the coherency systems may also perform one or more of the methods and/or operations described below to calculate a distance between the tensor of interest and each of one or more tensors of a corpus of similar documents or texts.

In one implementation, the system 300 may receive one or more provided electronic documents 302 or more generally obtains electronic access to such documents through a file system, a database, and the like. In various possible examples, the electronic document 302 may any type of document including legal documents (contracts, leases, licenses, patents, etc.). Any references herein to a particular example such as termination clauses are used only to illustrate various concepts and should not be considered limiting. In the example illustrated, the electronic document image 322 may be stored in a system database or other memory provided by a language coherency system 306. The database can be a relational or non-relational database, and it will be apparent to a person having ordinary skill in the art which type of database to use or whether to use a mix of the two. In some other embodiments, the document may be stored in a short-term memory rather than a database or be otherwise stored in some other form of memory structure. Documents stored in the system database may be used later for training new machine learning models and/or continued training of existing machine learning models through utilities provided by the language coherency system 306. The language coherency system 306 can be a cloud platform or locally hosted. The language coherency system 306 may also be accessible through a user interface 313 executed on a user device 314, such as a desktop computer or laptop.

The language coherency system 306 may, in some instances, obtain or identify unique values from one or more of the electronic documents 302, such as clauses, terms, phrases, paragraphs, and the like, and classify the unique values for use in comparison with other text or documents. For example, the unique values for the documents 302 may be extracted through one or more artificial intelligent or machine learning techniques to extract data from the documents and/or interpret portions of the document content to infer the unique attributes from the documents to classify the values. Some particular techniques for extracting data from the documents to generate the unique values of the documents are described in U.S. patent application Ser. No. 15/887,689 discussed above.

Figure 4:
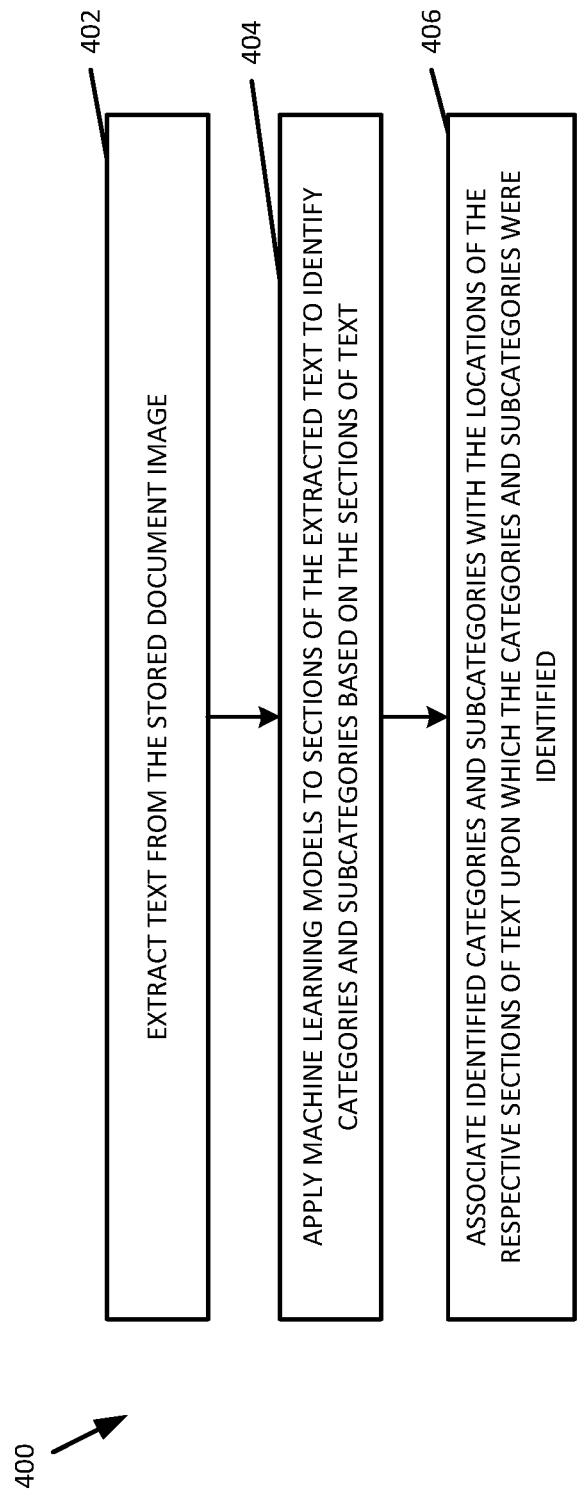
FIG. 4 is a flowchart of a method for determining a coherency of language of a text portion of a document to similar text portions of other documents in a computing environment, in accordance with various embodiments.

In general, the language coherency system 306 may utilize machine learning techniques for identifying and/or extracting unique values from documents, as illustrated in the method 400 of FIG. 4. In one implementation, text may be extracted from the document in operation 402 via, e.g., an Optical Character Recognition ("OCR") software of a storage and machine learning support 308 subsystem or other software for analyzing and extracting information from a document. In some instances, the text may be associated with a location in the document from where it was extracted. The locations of the extracted text can be saved to the remote device 310 as document location data 323 specifically tied to the relevant document 322. Machine learning models may also be applied to the text to identify categories and subcategories for the text in operation 404. In one example, machine learning services 308 utilizes storage and machine learning support 308 to retrieve trained models 321 from remote device 310, which may include a database or other data storage facility such as a cloud storage service. The machine learning models 321 may identify categories and subcategories based on learned ontologies which are taught to the models through training on batches of text from previous documents received by the system and from training data, which may be acquired during the initial deployment of the system or otherwise. A learned ontology can allow a machine learning model 321 to identify a category or subcategory based on relationships between words, key words, and other factors determined by the machine learning algorithm employed, and will identify concepts and information embedded in the syntax and semantics of text. Thus, where a simple key word search of extracted text may not be capable alone of identifying a "termination clause," machine learning can be used to analyze the extracted text and identify the "termination clause" based on a language common to termination clauses (e.g., use of the term "termination", corresponding dates of related clauses, identification of parties, etc.) to identify probable formats for the termination clause and/or other qualities of the text (e.g., proximate categories, such as lessor name or related categories, and the like). In another example, a "termination clause" provision may not include a header titling it "termination clause" and may not use the words "termination clause" in the provision. Thus, the machine learning models may process the extracted words to identify if a portion of the extracted text is a "termination clause" provision based on the use of similar words to identify a category. Such named entity resolution techniques may be applied to any identified text in a document. The machine learning algorithm employed may be a neural network, a deep neural network, support vector machines, Bayesian network, a combination of multiple algorithms, or any other implementation. The identified categories and subcategories may be associated with the locations of the respective sections of text upon which the categories and subcategories were identified in operation 406. This information may be used to generate a coherency or other analysis of a received tensor of text, as described in more detail below.

As mentioned, the language coherency system 306 may be configured to identify portions of an electronic document similar to the text associated with a tensor and to calculate a tensor of the identified text or documents at the local network. In particular, the language coherency system 306 may utilize the categories and/or subcategories of the text of a document or documents described above to identify a portion of a document that corresponds to a received tensor. For example, a tensor associated with a termination clause of a contract received at the language coherency system 306 may cause the system to identify text within the electronic documents 302 corresponding to a termination clause category or subcategory. In some instances, the tensor may be received at the language coherency system 306 with an identification of a category or subcategory to which the tensor applies or corresponds. The language coherency system 306 may then identify similar categories or subcategories of the electronic documents 302 of the system 300 for comparison to the tensor. Further, because the language coherency system 306 has location information within the documents for the text corresponding to the categories and/or subcategories, a clause or other text similar to that associated with the received tensor may be identified within the electronic documents 302.

Once a similar text or document is identified, the language coherency system 306 may generate a tensor of each of the text or documents of the corpus. Generating the tensor may be similar to that described above and may use, among other possible techniques, a pre-defined hashing algorithm, trained vocabulary based methods such as tf-idf, or a trained machine learning based embedding model. After generation of the tensors of the corpus, the language coherency system 306 may determine semantic similarities of the received tensor to the corpus tensors based on particular ontologies. In one particular example, the language coherency system 306 may determine some distance or proximity-based scoring algorithm to compute the distance between the tensor of interest and each of the tensors of the corpus. One example of such a distance or proximity-based algorithm is a cosine similarity algorithm, discussed herein with relation to FIGS. 5A-6.

FIG. 5A and FIG. 5B depict a first and second example, respectively, of tensor or text clustering along two and three dimensions respectively. A similarity of the tensors can be defined along (e.g., mapped to) a plurality of dimensions, including a two-dimensional ontological space 500 or a three-dimensional ontological space 550. While two- and three-dimensional spaces are described, it is to be understood that a space of any number of dimensions may be used and clustered upon. For example, larger texts or provisions may be mapped to a certain portion of a mapped ontological space having a great many dimensions (e.g., 4 or more) and thus may be difficult or impossible to visually render.

Here, the two-dimensional (e.g., having an x axis and a y axis) ontological space 500 may relate to words or characters in the text associated with the tensor identified by the end user device 104 and received at the global language coherency system 112 as compared to similar texts of the tenant networks 106-110. A clustering service of each of the local coherency systems 114-118 may identify a first group of words (e.g., graph points) of the locally maintained documents of the tenant networks 106-110 that are the same or similar to the language of the text associated with the identified tensor. The two-dimensional graph 500 includes points 510 that correspond to the similarities between two such tensors. In particular, each point 510 of the graph 500 corresponds to the number of times a word that is shared between the two texts being compared appears in the first text (represented along the x-axis) and the number of times the same word appears in the second text (represented along the y-axis). Each point 510 may correspond to a shared word within the two texts, with the words most commonly shared between the two texts appearing in the upper right-hand side of the two-dimensional graph. In some instances, a distance may be calculated for each point 510 in the graph 500 from origin point 502. As discussed in more detail below, these distances may be converted, combined, altered, or otherwise analyzed to obtain a general conformity of the identified text to the text of a document of the tenant networks 106-110. Further, although discussed herein as a comparison of similar words, the two-dimensional graph 500 may represent any quantifiable and calculable result of a text-comparison algorithm to determine a similarity between the identified text and the text of one or more documents of the tenant networks 106-110.

In a similar manner, a three-dimensional ontological space 550 may be generated through a comparison of the text associated with the received tensor and the text of two or more documents of a tenant network 106-110. For example, a word of the identified text may appear in a similar provision in two documents of the local coherency system A 114 of tenant network A 106. The number of times that the shared word, phrase, character, etc. appears in the compared texts may be counted and graphed in the three-dimensional space 550. Each point 560 in the graph 550 may therefore have a q value, an r value, and an s value representing the points location in the space 550, with each value corresponding to a number of instances a character, word, phrase, etc. appear in the compared texts. In addition, each local coherency system 114-118 may calculate a distance or proximity of each point 560. In one example, the local coherency system 114-118 may utilize a cosine-similarity algorithm to the distance between the tensor of interest and each of the tensors of the corpus of documents for the corresponding tenant network 106-110. While axes are labeled for visual and explanatory purposes, it will be understood by a person having ordinary skill in the art that each axis of a space may have any or no particular label.

A corpus of more than two documents, texts, or other portions of a document may be similarly graphed in still more dimensions and a distance to the graphed points may be calculated. These distances may be determined for each tenant network 106-110. For example, local coherency system A 114 may receive the tensor of interest from the global language coherency system 112 as identified or supplied by the end user device 104. The local coherency system A 114 may identify one or more other documents at the tenant network that include a portion, such as a clause, that corresponds to the tensor of interest. The local coherency system A 114 may then compare the tensor of interest to the tensors of the identified documents or texts at tenant network A 106 through the graphing algorithm discussed above. Once graphed, a distance component for the graphed points of the compared tensors may be calculated by the local coherency system A 114. Local coherency system B 116 and/or local coherency system C 118 may also execute similar algorithms for documents local to the respective tenant network. Each of the calculated distances may then be transmitted back to the global coherency system 112 of cloud network 102.

Other calculations may also be determined by the local coherency systems 114-118. For example, each coherency system may determine a risk score associated with the comparison of the tensor of interest and the corpus. The risk score may be associated with how similar the tensor of interest is to the corpus and/or how the determined distances of the graphs are distributed. In this case, a risk model may compute a risk score for each of the text tensors of a tenant network and provide those risk scores to the global language coherency system 112. Other algorithms for scoring a similarity of the tensor of interest to the corpus of a tenant network may also be utilized, in addition to or in place of the above techniques. Regardless, each local coherency system 114-118 associated with separate tenant networks 106-110 may determine an analysis score of a tensor of interest to a corpus of similar tensors within the respective tenant networks.

Returning to the method 200 of FIG. 2, the global language coherency system 112 may receive, in operation 206, the calculated distances or other similarity scores from one or more of the tenant networks 106-110 (and in particular, from one or more of the local coherency systems 114-118 of the respective tenant networks). The distances received from each tenant network only apply to documents or other texts stored at the corresponding tenant networks such that the distances represent a portion of the total corpus for comparison to the tensor of interest. Thus, in operation 208, the global language coherency system 112 may calculate a distribution of the received distances and/or scores for the tensor of interest to the to the documents of the tenant networks 106-110. In this manner, the set of tensor distances could be summarized statistically to demonstrate the relative distribution of tensors in the corpus and the percentile rank of the tensor of interest within that distribution. For example, "similar" tensors may be of interest for understanding the commonalities between the compared texts while "dissimilar" tensors may also be of interest to discern the relative variability observed within the text corpus. The tensors could even be clustered using one of many clustering approaches to show similar variants of language in an aggregated sense. For example, various clustering algorithms may be used, such as k-means, means shift, Gaussian models, and the like as will be apparent to a person having ordinary skill in the art to cluster the received distances or scores. In some examples, topological distribution along dimensions may be used instead of, or along with, clustering in order to identify semantically and ontologically similar tensors. In operation 210, the calculated distribution of distances and/or scores may be provided to a requesting device, such as the end user device 104 or a requesting tenant network. The provided distribution of distances and/or scores provides the requesting device with a comparison of the identified text to similar text within the corpus of documents spread among the various tenant networks 106-110 in communication with the global language coherency system 112 without providing access to the documents of the corpus outside of the local tenant network. The end user device 104 or a user of the end user device may obtain an understanding of the similarity, coherency, risk, conformance, and/or anomaly of the identified text to the corpus of documents of the entire document management system 100.

In operation 212, the calculated distribution may be displayed in a user interface executed by a computing device or display device. For example, end user device 104 may execute a user interface for communicating with global language coherency system 112, such as providing information to the global coherency system and viewing results of the methods described herein. The calculated distribution of the identified text to similar text within the corpus may be displayed on a display device in communication with the end user device. In addition, the identified text may also be displayed and one or more obtained text spans from the corpus may also be displayed for comparison to the identified text. Such text may be made anonymous such that a user of the end user device 104 may not identify from which tenant network 106-110 the similar or dissimilar text is obtained. In general, the user interface of the end user device 104 may be configured to display any information corresponding to the comparison of the identified text to the corpus of texts or documents.

In one example, the global language coherency system 112 may provide a distribution of the received distances to the end user device 104 in the form of a graph. FIG. 6A is a first distribution graph of calculated distances of a tensor of interest to a corpus of related tensors. In the example graph 600 shown, a distribution of the received distances from the tenant networks 106-110 (x-axis 602) are plotted against the number of times (y-axis 604) those distances are calculated by the local coherency systems 114-118. The curve of plots indicates that the majority of distances received were short distances and very few long distances were received from the local coherency systems 114-118. As longer distances generally indicate a higher correlation of the tensor of interest to the corpus of related texts, this type of distribution indicates that the tensor of interest and the corpus did not have a high correlation rate or commonality. In other words, while the tensor of interest shared many of the same words with the corpus, the repeated number of such occurrences in the comparisons was low suggesting that the tensor of interest does not closely mirror the corpus. Alternatively, FIG. 6B is a second distribution graph 650 of calculated distances of a tensor of interest to a corpus of related tensors. The example graph 650 of FIG. 6B includes a similar graphing of the received distances 652 against the number of occurrences of those distances 654. Here, the plot 650 indicated that most of the received distances were long distances, indicating a high correlation of the tensor of interest to the corpus of documents of the local coherency systems 114-118. Thus, it may be determined that the provision associated with the tensor of interest highly correlates with other provisions or texts of the documents of the local coherency systems 114-118. This may also indicate that the tensor of interest has a low risk value associated with the clause as the text does not stray much from the other similar provisions within the corpus of documents. In general, any number of conclusions and analyses may be obtained from the distribution of distances and/or scores provided by the global language coherency system 112. For example, the global language coherency system 112 may, through an analysis of the distribution of distances and/or scores received from the tenant networks 106-110, calculate a coherency and/or anomaly score for the tensor of interest in comparison to the corpus. This coherency and/or anomaly score may be transmitted to the end user device and, in some instances, displayed on a display device. In other instances, the distribution of distances and/or scores may be provided to and displayed by the end user device 104 on the display in communication with the end user device.

Figure 7:
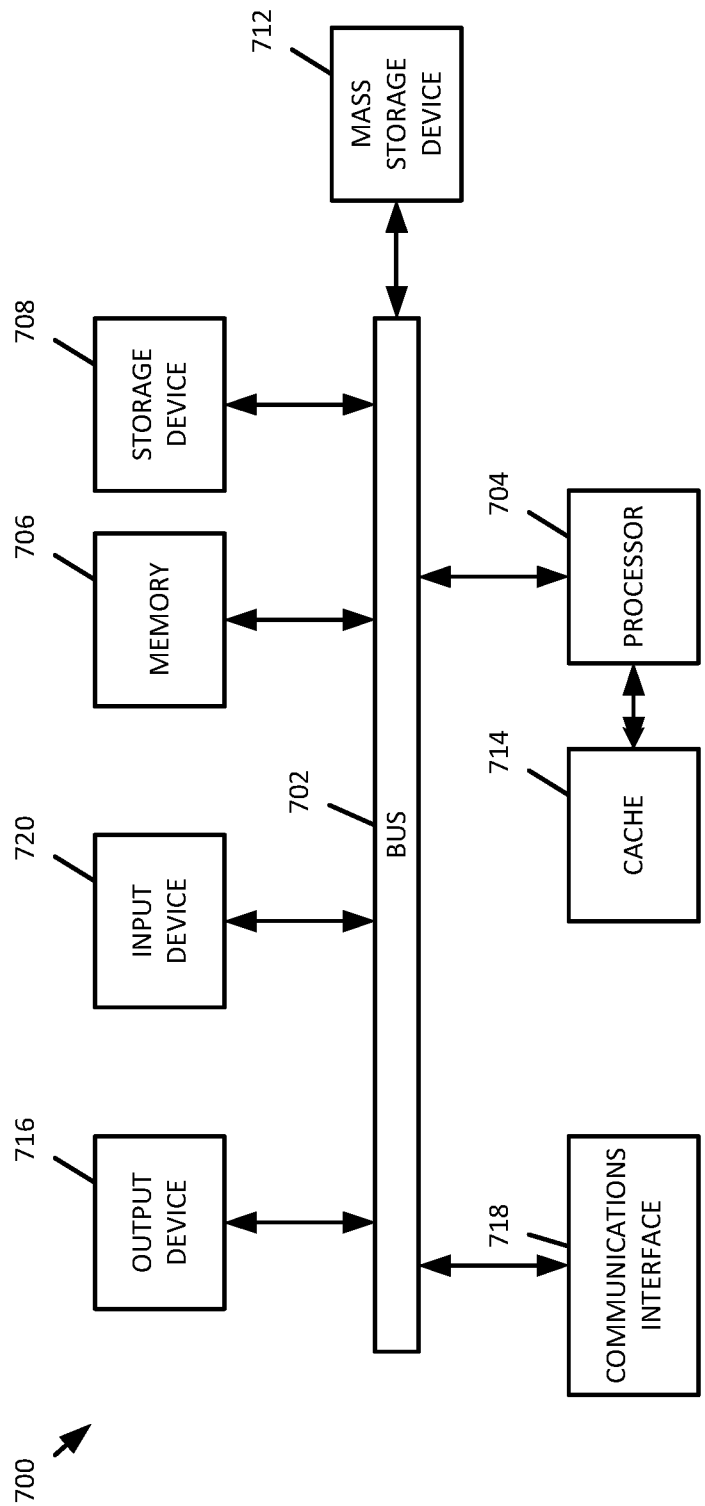
FIG. 7 is a system diagram of an example computing system that may implement various systems and methods discussed herein, in accordance with various embodiments.

FIG. 7 an example computing system 700 that may implement various systems and methods discussed herein. The computer system 700 includes one or more computing components in communication via a bus 702. In one implementation, the computing system 700 includes one or more processors 704. The processor 704 can include one or more internal levels of cache (not depicted) and a bus controller or bus interface unit to direct interaction with the bus 702. Main memory 706 may include one or more memory cards and a control circuit (not depicted), or other forms of removable memory, and may store various software applications including computer executable instructions, that when run on the processor 704, implement the methods and systems set out herein. Other forms of memory, such as a storage device 708 and a mass storage device 712, may also be included and accessible, by the processor (or processors) 704 via the bus 702. The storage device 708 and mass storage device 712 can each contain any or all of an electronic document.

The computer system 700 can further include a communications interface 718 by way of which the computer system 700 can connect to networks and receive data useful in executing the methods and system set out herein as well as transmitting information to other devices. The computer system 700 can include an output device 716 by which information is displayed, such as the display 300. The computer system 700 can also include an input device 720 by which information is input. Input device 720 can be a scanner, keyboard, and/or other input devices as will be apparent to a person of ordinary skill in the art. The system set forth in FIG. 7 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for processing an electronic document, the system comprising:
   a processor; and
   a memory comprising instructions that, when executed, cause the processor to:
      transmit an initial tensor generated from a text portion of an electronic document and a relative location of the text portion to a plurality of computing environments, each of the plurality of computing environments hosting a language coherency system remotely located separate from the processor and configured to calculate a comparison score based on a comparison of the initial tensor to a corpus of local electronic documents of a respective language coherency system;
generate a distribution of comparison scores received from each of the language coherency systems;
execute a risk scoring model to generate an assigned risk score of the initial tensor based on the comparison of the initial tensor to the corpus of local electronic documents, the assigned risk score associated with the comparison scores received from each of the language coherency systems;
display, on a display device, the distribution of comparison scores for the initial tensor for comparison of the text portion to a plurality of corresponding tensors from the corpus of local electronic documents and the assigned risk score; and
identify, based on the distribution of comparison scores, a similarity of the text portion of the electronic document to the corpus of local electronic documents of the respective language coherency systems while maintaining inaccessibility of the corpus of local electronic documents by the processor.

2. The system of claim 1 wherein the instructions further cause the processor to:
execute a conversion algorithm to convert the text portion of the electronic document into the initial tensor.

3. The system of claim 2 wherein the conversion algorithm is one of a hashing algorithm, a term frequency-inverse document frequency (tf-idf) algorithm, or a trained machine learning-based embedding model.

4. The system of claim 1 wherein the instructions further cause the processor to:
receive the initial tensor from a computing device in communication with the processor.

5. The system of claim 1 wherein the language coherency system is further configured to:
identify a portion of the corpus of local electronic documents of a same type as the text portion of the electronic document; and
generate the corresponding tensors based on the identified portion of the corpus of local electronic documents.

6. The system of claim 5 wherein calculating the comparison score comprises:
executing a distance-based scoring algorithm to determine a plurality of distance calculations in a dimensional ontological space, each of the plurality of distance calculations corresponding to a similarity of the text portion of the electronic document associated with the initial tensor to the identified portion of the corpus of local electronic documents.

7. The system of claim 1 wherein the plurality of computing environments is one of a public cloud computing environment, a private cloud computing environment, or a private tenant network.

8. The system of claim 1 wherein the distribution of comparison scores indicates a similarity of the text portion of the electronic document to the corpus of local electronic documents.

9. A method for processing a portion of an electronic document, the method comprising:
executing, via a processing device, a conversion algorithm to convert a text portion of the electronic document into an initial tensor;
transmitting the initial tensor and a relative location of the text portion to a plurality of computing environments different than the processing device, each of the plurality of computing environments hosting a language coherency system to calculate a similarity score through a comparison of the initial tensor to a corpus of local electronic documents of a respective language coherency system;
generating, via the processing device, a distribution of similarity scores generated by each of the language coherency systems based on the comparison of the initial tensor to a plurality of comparison tensors of local electronic documents; and
executing a risk scoring model to generate an assigned risk score of the initial tensor based on the comparison of the initial tensor to the corpus of local electronic documents, the assigned risk score associated with the comparison scores received from each of the language coherency systems.

10. The method of claim 9 further comprising:
executing a conversion algorithm to convert the text portion of the electronic document into the initial tensor.

11. The method of claim 10 wherein the conversion algorithm is one of a hashing algorithm, a term frequency-inverse document frequency (tf-idf) algorithm, or a trained machine learning-based embedding model.

12. The method of claim 9 further comprising:
identifying a portion of the corpus of local electronic documents of a same type as the text portion of the electronic document; and
generating the comparison tensors based on the identified portion of the corpus of local electronic documents.

13. The method of claim 12 wherein calculating the similarity score comprises:
executing a distance-based scoring algorithm to determine a plurality of distance calculations in a dimensional ontological space, each of the plurality of distance calculations corresponding to a similarity of the text portion of the electronic document associated with the initial tensor to the identified portion of the corpus of local electronic documents.

14. The method of claim 9 wherein the plurality of computing environments is one of a public cloud computing environment, a private cloud computing environment, or a private tenant network.

15. The method of claim 9 wherein the distribution of comparison scores indicates a similarity of the text portion of the electronic document to the corpus of local electronic documents.

16. One or more non-transitory computer-readable storage media storing computer-executable instructions for performing a computer process on a computing system, the computer process comprising:
executing, via a processing device, a conversion algorithm to convert a text portion of a received electronic document into an initial tensor;
transmitting the initial tensor and a relative location of the text portion to a plurality of computing environments, each of the plurality of computing environments hosting a language coherency system to calculate a similarity score through a comparison of the initial tensor to a corpus of local electronic documents of a respective language coherency system;
generating, via the processing device, a distribution of similarity scores generated by each of the language coherency systems based on the comparison of the initial tensor to a plurality of comparison tensors of local electronic documents; and
executing a risk scoring model to generate an assigned risk score of the initial tensor based on the comparison of the initial tensor to the corpus of local electronic documents, the assigned risk score associated with the comparison scores received from each of the language coherency systems.

17. The one or more non-transitory computer-readable storage media of claim 16 storing computer-executable instructions for performing the computer process on the computing system, the computer process further comprising:
  executing a conversion algorithm to convert the text portion of the electronic document into the initial tensor, the conversion algorithm is one of a hashing algorithm, a term frequency-inverse document frequency (tf-idf) algorithm, or a trained machine learning-based embedding model.

18. The one or more non-transitory computer-readable storage media of claim 16 storing computer-executable instructions for performing the computer process on the computing system, the computer process further comprising:
  identifying a portion of the corpus of local electronic documents of a same type as the text portion of the electronic document; and
  generating the comparison tensors based on the identified portion of the corpus of local electronic documents, wherein calculating the similarity score comprises executing a distance-based scoring algorithm to determine a plurality of distance calculations in a dimensional ontological space, each of the plurality of distance calculations corresponding to a similarity of the text portion of the electronic document associated with the initial tensor to the identified portion of the corpus of local electronic documents.

* * * * *